(12) United States Patent
Chambers et al.

(10) Patent No.: US 7,657,754 B2
(45) Date of Patent: Feb. 2, 2010

(54) METHODS AND APPARATUS FOR THE SECURE HANDLING OF DATA IN A MICROCONTROLLER

(75) Inventors: Michael Joseph Chambers, Erlangen (DE); Michael Kiessling, Freising (DE); Kenneth A. Tuchman, Munich (DE); Hai Wang, Poing (DE)

(73) Assignee: Agere Systems Inc, Allentown, PA (US)

( * ) Notice: Subject to any disclaimer, the term of this patent is extended or adjusted under 35 U.S.C. 154(b) by 853 days.

(21) Appl. No.: 11/297,484

(22) Filed: Dec. 8, 2005

(65) Prior Publication Data

US 2007/0136576 A1    Jun. 14, 2007

(51) Int. Cl.
*G06F 12/14* (2006.01)
(52) U.S. Cl. .......................... 713/188; 726/22; 711/163
(58) Field of Classification Search .................. 713/187
See application file for complete search history.

(56) References Cited

U.S. PATENT DOCUMENTS

| 5,325,430 | A |   | 6/1994 | Smyth et al. | |
|---|---|---|---|---|---|
| 5,825,878 | A | * | 10/1998 | Takahashi et al. | 713/190 |
| 5,892,826 | A |   | 4/1999 | Brown et al. | |
| 5,943,421 | A |   | 8/1999 | Grabon | |
| 6,934,389 | B2 |   | 8/2005 | Strasser et al. | |
| 7,107,459 | B2 | * | 9/2006 | Caronni et al. | 713/190 |
| 7,171,566 | B2 | * | 1/2007 | Durrant | 713/189 |
| 7,502,946 | B2 | * | 3/2009 | Perkins et al. | 713/193 |
| 2002/0048369 | A1 |   | 4/2002 | Ginter et al. | |
| 2003/0140245 | A1 | * | 7/2003 | Dahan et al. | 713/200 |
| 2003/0229789 | A1 |   | 12/2003 | Morais et al. | |
| 2005/0033973 | A1 | * | 2/2005 | Kamada et al. | 713/193 |
| 2005/0172121 | A1 |   | 8/2005 | Risan et al. | |
| 2006/0047972 | A1 | * | 3/2006 | Morais | 713/190 |
| 2008/0288785 | A1 | * | 11/2008 | Rao et al. | 713/190 |

FOREIGN PATENT DOCUMENTS

WO    PCTUS0628746    2/2008

* cited by examiner

*Primary Examiner*—Matthew B Smithers
(74) *Attorney, Agent, or Firm*—Ryan, Mason & Lewis, LLP

(57) ABSTRACT

Apparatus and methods are presented for protecting data in microcontrollers from both malicious software processes running inside the device as well as from unauthorized attempts to read the data from an external data bus and/or external memory. An illustrative embodiment of the invention accomplishes these security improvements, in part, by utilizing an enhanced memory management unit (MMU). The enhanced MMU is configured to prevent one software process running on the microcontroller from accessing data associated with a different software process running on the same microcontroller. Moreover, data transmitted over an external data bus or stored in an external memory is encrypted, thereby reducing the chances that unauthorized users will gain exploitable information from this data.

20 Claims, 2 Drawing Sheets

METHODS AND APPARATUS FOR THE SECURE HANDLING OF DATA IN A MICROCONTROLLER

FIELD OF THE INVENTION

This invention relates generally to data processing circuitry, and more particularly to apparatus and methods for improving data security in microcontrollers.

BACKGROUND OF THE INVENTION

Computer systems typically have three main blocks: a central processing unit (CPU), memory, and input/output circuitry. Microcontrollers, which are also known as microcomputers or embedded controllers, may incorporate all three of these blocks onto a single integrated circuit chip. Microcontrollers are used for a variety of control applications such as cellular telephones and other mobile devices, television remote controls, microwave ovens, and the like. Depending on the application, the microcontroller may either be able to have all its data on-chip, or it may have some data on-chip and some off-chip. For those applications where data is stored off-chip, a microcontroller is typically designed to operate in an "expanded mode" in which address and data signals are present on integrated circuit pins. These pins allow the microcontroller to access the data in external memory via an external data bus.

It is frequently important to restrict access to the data stored in mobile devices that use microcontrollers. By their very nature, such mobile devices are more susceptible to loss and theft than non-portable devices. Furthermore in many applications in which the software is complicated, such as cellular telephones, the required data is usually too large to fit completely on-chip. Thus, at least part of the data will typically be located off-chip and the microcontroller must access it in expanded mode. As a result, once such a device is in the hands of an unauthorized user, its data becomes highly susceptible to being accessed and misused. A common approach to accessing the data stored in an external memory is to simply pull the external memory chip out of its socket and read the stored data using separate hardware. Moreover, even data stored internally can frequently be read by probing the external data bus and analyzing the internal data flow and memory status in a kind of reverse-engineering.

In order to protect this sensitive data which may be partially off-chip, certain microcontrollers have implemented address and data encryption techniques. Address encryption consists generally of scrambling the physical locations within the microcontroller's internal memory so that unauthorized users cannot read out the data by determining the logic states of memory cells and knowing the sequence due to the physical location of the memory cells. Data encryption, in turn, consists of encrypting data when it is passed from the CPU or internal memory to external memory, and decrypting data when it is read from external memory into the CPU or internal memory. There are many well known encryption schemes which use mathematical transformations and may even use the address location of the data as part of the transformation.

Nonetheless, despite the improved data security provided by these methods, at least one significant vulnerability remains. In a microcontroller, a software application will frequently have unlimited access to all the data residing in the microcontroller's memory, both internal and external. As a result, software processes may be used as a means to maliciously access sensitive data residing in memory. Unfortunately, while a personal computer may respond to such threats by using techniques such as virtual machines or emulators, such techniques are generally not available in embedded microcontroller applications.

For the foregoing reasons, there is a need to better protect sensitive data associated with a microcontroller from both malicious software processes running inside the device, as well as from unauthorized attempts to read the data from an external data bus and/or external memory.

SUMMARY OF THE INVENTION

The present invention sets forth apparatus and methods for protecting data in microcontrollers from both malicious software processes running inside the device, as well as from unauthorized attempts to read the data from an external data bus and/or external memory. An illustrative embodiment of the invention accomplishes these security improvements, in part, by utilizing an enhanced memory management unit (MMU). The enhanced MMU is configured to prevent one software process running on the microcontroller from accessing data associated with a different software process running on the same microcontroller. Moreover, data transmitted over an external data bus or stored in an external memory is encrypted, thereby reducing the chances that unauthorized users will gain exploitable information from this data.

In accordance with an aspect of the invention, an apparatus comprises a CPU, a memory and a MMU, wherein the memory and the MMU are coupled to the CPU. The CPU is operative to at least execute a first software process utilizing a first set of data and a second software process utilizing a second set of data. In addition, the memory is operative to store the first set of data in a first memory portion and to store the second set of data in a second memory portion. To achieve the improved data security, the MMU is operative to allow the central processing unit to access the first memory portion only when executing the first software process and to access the second memory portion only when executing the second software process. Moreover, at least a portion of the first set of data and at least a portion of the second set of data are encrypted, and the encrypted portion of the first set of data is encrypted in accordance with a different encryption key than the encrypted portion of the second set of data.

In an illustrative embodiment, a microcontroller is coupled to an external memory via an external data bus. In addition, the microcontroller is coupled to an external key storage memory. The microcontroller, in turn, comprises a CPU, a MMU, a cryptographic unit and a key manager. The external memory comprises a plurality of memory portions, one memory portion associated with each software process running on the microcontroller. When a particular software process is being executed by the CPU, the MMU only allows the CPU to access the specific memory portion associated with that particular software process. In addition, the MMU, the cryptographic unit, the key manager and the external key storage memory cooperate to encrypt data before it is transmitted to the external memory in a write operation, and to decrypt data when it is received from the external memory in a read operation.

Advantageously, apparatus and methods in accordance with aspects of this invention improve data security in a microcontroller with respect to both malicious software processes running inside the device as well as from unauthorized attempts to read the data from an external data bus and/or external memory. These and other features and advantages of the present invention will become apparent from the following detailed description which is to be read in conjunction with the accompanying drawings.

DETAILED DESCRIPTION OF THE INVENTION

The present invention will be illustrated below in conjunction with an illustrative embodiment of data processing circuitry. It should be understood, however, that the invention is not limited to the particular circuitry arrangements and elements of the illustrative embodiment. Other possible modifications and improvements to the illustrative embodiment within the scope of this invention will be apparent to those skilled in the art.

It should be noted that the word "microcontroller" as used herein is intended to incorporate any device comprising a CPU and memory. Moreover, the word "data," as used herein, is intended to incorporate any form of information that can be utilized by a CPU to accomplish one or more purposes of the data processing circuitry within which the CPU resides. Data, therefore, comprises both programming code (e.g., instructions to be executed by the CPU) as well as the information on which and with which the CPU performs operations.

For illustrative purposes, the present invention will be illustrated with an embodiment comprising a microcontroller that, to at least some extent, relies on external memory for data storage. In addition, the microcontroller in the illustrative embodiment will be capable of running a plurality of different software processes. Such characteristics are typical of microcontrollers utilized, for example, in mobile devices like cellular telephones and personal digital assistants. Moreover, these characteristics of the illustrative embodiment are useful for illustrating how the use of apparatus and methods in accordance with the present invention can be utilized to improve data security in such circuitry.

Figure 1:
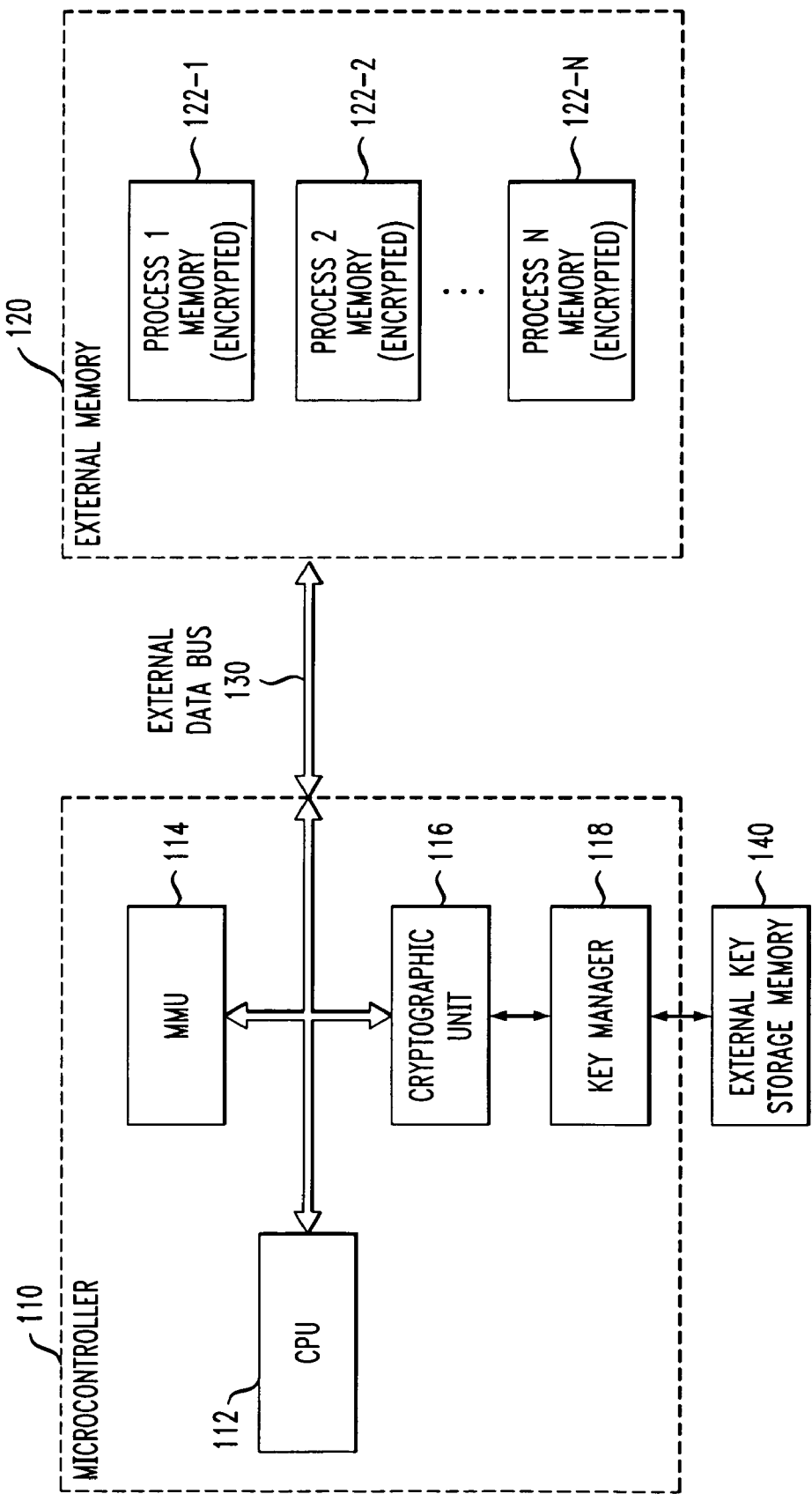
FIG. 1 shows a block diagram of data processing circuitry in accordance with an illustrative embodiment of the present invention.

FIG. 1 shows a block diagram of data processing circuitry 100 in accordance with an illustrative embodiment of the present invention. The data processing circuitry comprises both a microcontroller 110 and an external memory 120. The microcontroller and external memory are connected by an external data bus 130. An external key storage memory 140 lies outside the microcontroller and is coupled to elements within the microcontroller.

FIG. 1 further shows some of the elements within the microcontroller 110 and the external memory 120. More specifically, the microcontroller comprises a CPU 112 and a MMU 114. In addition, the microcontroller comprises two elements not typically found in a microcontroller, namely a cryptographic unit 116 and a key manager 118. Each of the four elements within the microcontroller is in communication with the other elements. External memory 120, moreover, comprises a plurality of memory portions, each labeled 122-i where i=1, 2, ... N and N is the number of software processes capable of being executed by the CPU.

It should be noted that FIG. 1 is not intended to show every element that will be required to make the illustrative embodiment functional. Rather, for ease of understanding, only those elements that are necessary to illustrate the particular functions and advantages of the present invention are shown. One skilled in the art will recognize what additional elements would be required. The microcontroller 110, for example, may require additional elements such as, but not limited to, internal memory, data caches, instruction caches, translation lookaside buffers, write buffers and bus interface circuitry. Again, one skilled in the art will recognize the various functions provided by these additional elements.

The external memory 120 may be implemented in any form of memory circuitry but will be preferably implemented in a dynamic random access memory (DRAM). DRAM typically has a high storage density, fast access times, and a relatively low cost per unit of storage when compared to other memory technologies. Moreover, DRAM can be made to operate at low power. Such low power operation is critical in mobile devices where long battery life is very desirable.

Advantageously, the illustrative embodiment in FIG. 1 has enhanced data security both with respect to access by malicious software processes running inside the microcontroller 110, as well as with respect to unauthorized attempts to read the data from the external data bus 130 and/or external memory 120. The illustrative embodiment addresses the threat posed by malicious software processes in two ways. First, the MMU 114 is configured to allow the CPU 112 to access a particular memory portion 122-i only when the CPU is executing the corresponding software process, software process i. This means, for example, that the MMU will allow the CPU to access the data in the first memory portion 122-1 only when the CPU is executing software process 1, but will not allow the CPU to access this same memory portion when the CPU is executing a software process other than software process 1, e.g., software process 2. Second, the MMU, in cooperation with the key manager 118 and the external encryption key storage memory 140, further determines a different encryption key for each of the software processes running on the CPU. These encryption keys are used to encrypt data during write operations and decrypt data during read operations. As a result, the data associated with a particular software process running on the CPU is encrypted in accordance with a different encryption key from data associated with a different software process.

With respect to unauthorized attempts to read the data from the external data bus 130 and/or external memory 120, the above-described cryptography assures that sensitive data stored in the external memory and transmitted over the external data bus is encrypted. Such cryptography makes it very difficult for an unauthorized user to gain exploitable information from this data.

Figure 2:
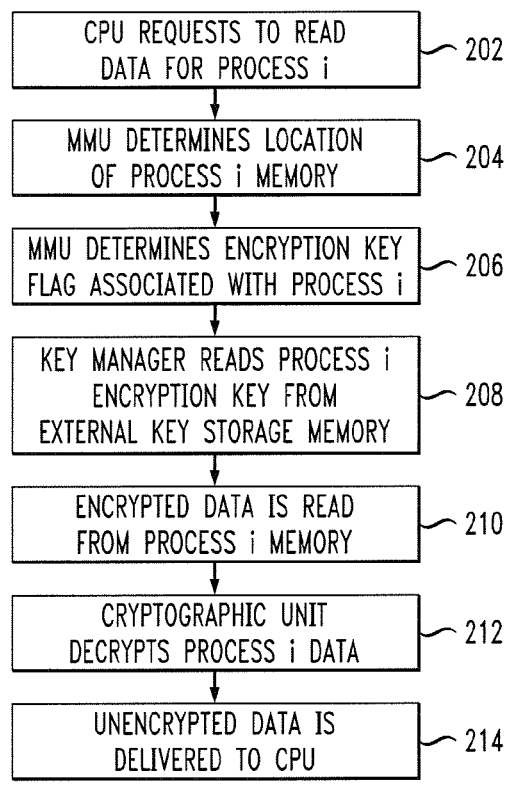
FIG. 2 shows a flow diagram of an illustrative read operation in the FIG. 1 data processing circuitry.
Figure 3:
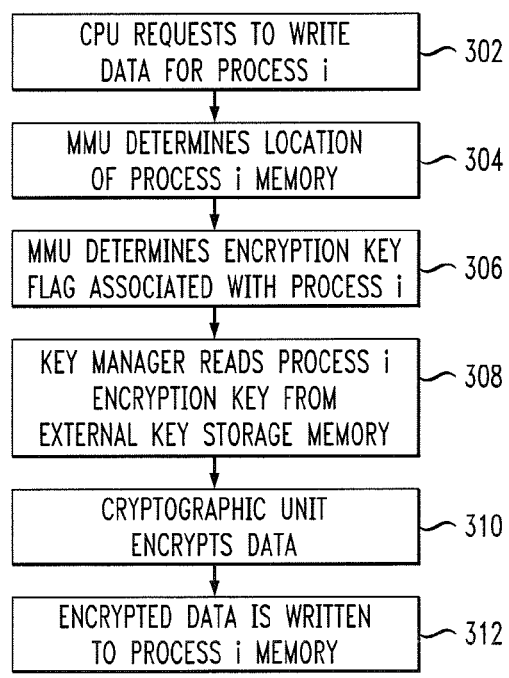
FIG. 3 shows a flow diagram of an illustrative write operation in the FIG. 1 data processing circuitry.

The implementation of these data security features in the FIG. 1 data processing circuitry 100 is further described in FIGS. 2 and 3 through flow diagrams of illustrative read and write operations. Referring first to step 202 in FIG. 2, a read operation is initiated by having the CPU 112 request to read data, the data to be utilized in executing a particular software process, software process i. After receiving this request from the CPU, the MMU 114 performs at least two operations. In a first operation, shown as step 204, the MMU determines the location of the particular process i memory portion 122-i within the external memory 120. In a second operation, step 206, the MMU determines an encryption key flag associated with software process i. Each of these operations is now further described.

The determination of the location of the particular process i memory portion 122-i by the MMU 114 in step 204 is a typical operation performed by a MMU and, therefore, will be familiar to one skilled in the art. The MMU will preferably determine the location of the particular memory portion by reference to one or more tables, commonly referred to as "translation tables" or "page tables," which are constantly updated as new software processes are executed by the CPU 112. For additional speed in making the table lookups, the translation tables may optionally be stored on the microcontroller 110 in a translation lookaside buffer which allows the MMU to forego having to access the translation tables in physical memory. As described earlier and in accordance with an aspect of the invention, data security is enhanced by having the MMU be operative to allow the CPU to access the particular memory portion 122-i only when executing the particular software process i. The MMU thereby allocates memory portions to individual software processes, and access to each memory portion is restricted to the particular owning software process.

The second operation of the MMU 114, namely the determination of an encryption key flag in step 206, on the other hand, is not an operation typically performed by MMUs and thus requires that new attributes be added to a typical MMU and its associated one or more translation tables. In accordance with an aspect of the invention, the MMU determines a different encryption key flag for each software process that will be executed by the microcontroller 110. For added security, the encryption key flag is preferably not the encryption key itself, but rather a string of data that can be used to identify an encryption key. Once determined, these encryption key flags are preferably stored as an added element in the same translation tables wherein the memory portions 122-i are mapped to each of the software processes. The "enhanced" MMU thereby becomes capable of mapping each software process executed by the CPU 112 to both an associated memory portion and to an associated encryption key flag.

Again referring to FIG. 2, step 208 comprises the key manager 118 using the encryption key flag determined by the MMU 112 to obtain an encryption key. In accordance with another aspect of the invention, encryption keys for the various software processes running in the microcontroller 110 are stored in the external key storage memory 140. The key manager preferably takes the encryption key flag provided by the MMU and uses the contents of this flag to address a lookup table. The lookup table, in a fashion similar to that of a translation table for the MMU, tells the key manager where physically in the external key storage memory the appropriate encryption key is stored. Once this information has been obtained, the key manager reads the particular encryption key from the external key storage memory.

It is noted that, in accordance with yet another aspect of the invention, the external key storage memory 140 is preferably implemented in a separate integrated circuit from the microcontroller 110. The external key storage memory, may, for example be implemented in a flash memory. Flash memory has the advantages of being non-volatile and relatively inexpensive. However, the external key storage memory may be implemented in any type of memory circuitry and still come within the scope of this invention. The advantages and disadvantages of each type of memory circuitry will be familiar to one skilled in the art.

Optionally, security may further be enhanced by having the encryption keys stored in the external encryption key storage memory 140 be themselves encrypted. This use of cryptography reduces the chance that the external encryption key storage memory can be removed and successfully analyzed using other hardware. Correspondingly, if the contents of the external encryption key storage memory are indeed encrypted, then the key manager 118 will have the added task of decrypting the encryption keys after they are read from the external encryption key storage memory in step 208.

The encryption keys themselves can be determined by a number of different techniques that will be familiar to one skilled in the art. The encryption keys could, for example, be determined based on a secret root key. Additionally and optionally, this secret root key could be regenerated by the key manager 118 at startup of the microprocessor 110, or, for even greater security, periodically during the time the microprocessor is operating. The corresponding encryption keys stored in the external encryption key storage memory 140 would thereby be periodically regenerated, substantially reducing the possibility that they could be compromised and exploited.

In step 210, the data requested by the CPU 112 is finally read from the memory portion 122-i designated by the MMU 114. When stored in the memory, this data is encrypted, having been encrypted during one or more write operations, the details of which will be discussed in more detail below. Once the encrypted data reaches the microcontroller 110, the cryptographic unit 116, in step 212, utilizes the encryption key determined by the key manager 118 to decrypt the data. In step 214, the unencrypted data is delivered to the CPU, thereby achieving a completed read operation.

A write operation is similar to the above-described read operation and is further detailed with reference to FIG. 3. Like the read operation, the write operation is initiated by the CPU 112. In step 302, the CPU requests to write data to memory in conjunction with the execution of a particular software process, software process i. In the next step, step 304, the MMU 114, as before, determines the location of the memory portion 122-i specifically designated for storing data associated with software process i. After this determination, the MMU, in step 306, further determines the encryption key flag for data of this type. This encryption key flag is utilized by the key manager 118 in step 308 to read the corresponding encryption key from the external key storage memory 140. The key manager also decrypts the encryption key if the encryption key is stored in the external key storage memory in encrypted form, as described earlier.

Subsequently, the write operation is continued in step 310 of FIG. 3, wherein the cryptographic unit 116 takes the encryption key determined by the key manager 118 and uses that encryption key to encrypt the data before it is written to the proper memory portion 122-i in step 312. A completed write operation in accordance with aspects of this invention is thereby achieved.

Encryption techniques for data in a data processing system such as the data processing circuitry 100 in the FIG. 1 embodiment are well known and, therefore, will be familiar to one skilled in the art. The cryptographic unit 116 may, for example, execute streaming cipher algorithms or block cipher algorithms. An encryption scheme based on block cipher algorithms may, as a further example, be based on the Data Encryption Standard, Advanced Encryption Standard or RSA Algorithm. These encryption schemes and others are described in more detail in A. Menezes et al., *Handbook of Applied Cryptography*, CRC Press, 1996, which is incorporated herein by reference. It is noted, moreover, that any data encryption methodology may be used and would still fall within the scope of this invention. It is preferable, however, that the encryption technique not be made so complex that it substantially degrades the data throughput performance of the cryptographic unit and thereby slows the overall data processing performance of the data processing circuitry.

Optionally, it should be recognized that the external memory 120 may also contain a shared memory portion to act as a storage medium for data that is to be used among more than one software process running on the microcontroller 110. A software programmer may, accordingly, designate that particular data be stored in this shared memory portion for use by other software processes. The data within the shared memory portion will preferably be encrypted like the other portions of the memory. Accordingly, the MMU 114 will be required to determine and store an encryption key flag for the shared memory portion. This encryption key flag will subsequently be used by the key manager 118 and the cryptographic unit 116, in conjunction with the external encryption key storage memory 140, to decrypt the data during read operations and encrypt the data during write operations, as described previously with reference to FIGS. 2 and 3, respectively.

Importantly, many of the elements described in this invention can be implemented in one or integrated circuits. As a result, an integrated circuit comprising features of this invention falls within the scope of the invention. The formation of integrated circuits is well known in the art. Generally, identical die are formed in a repeated manner on a surface of a semiconductor wafer. Each die includes elements described herein, and may include other structures or circuits. The individual die are cut or diced from the wafer, then packaged as an integrated circuit. One skilled in the art would know how to dice wafers and package die to produce integrated circuits.

It should also again be emphasized that the above-described embodiment of the invention is intended to be illustrative only. Other embodiments can use different types and arrangements of elements and steps for implementing the described functionality. These numerous alternative embodiments within the scope of the following claims will be apparent to one skilled in the art.

What is claimed is:

1. An apparatus comprising:
   a central processing unit, the central processing unit operative to execute at least a first software process utilizing a first set of data and a second software process utilizing a second set of data;
   a memory coupled to the central processing unit, the memory comprising a first memory portion operative to store the first set of data and a second memory portion operative to store the second set of data; and
   a memory management unit coupled to the central processing unit, the memory management unit operative to allow the central processing unit to access the first memory portion only when executing the first software process and to access the second memory portion only when executing the second software process;
   wherein at least a portion of the first set of data and at least a portion of the second set of data are encrypted, and the encrypted portion of the first set of data is encrypted in accordance with a different encryption key than the encrypted portion of the second set of data.

2. The apparatus of claim 1, further comprising a data bus operative at least in part to transmit the first and second sets of data between the central processing unit and the memory.

3. The data software processing unit of claim 2, wherein at least a portion of the data transmitted on the data bus is encrypted.

4. The apparatus of claim 1, further comprising a cryptographic unit, the cryptographic unit operative to encrypt and decrypt portions of the first and second sets of data.

5. The apparatus of claim 1, further comprising an encryption key storage memory, the encryption key storage memory operative to store encryption keys for the encrypted portions of the first and second sets of data.

6. The apparatus of claim 5, wherein the encryption keys stored in the encryption key storage memory are also encrypted.

7. The apparatus of claim 5, wherein the encryption key storage memory is at least partially implemented in flash memory circuitry.

8. The apparatus of claim 1, wherein the memory management unit is further operative to determine encryption key flags for respective ones of the first and second software processes, the encryption key flags indicative of which encryption keys are associated with the encrypted portions of the first and second sets of data.

9. The apparatus of claim 1, wherein the apparatus is at least partially implemented in a microcontroller.

10. The apparatus of claim 1, wherein the memory is at least partially implemented in a random access memory.

11. The apparatus of claim 1, wherein the central processing unit is implemented in an integrated circuit.

12. The apparatus of claim 11, wherein the memory is implemented in one or more integrated circuits, at least one of the one or more integrated circuits being separate from the integrated circuit comprising the central processing unit.

13. The apparatus of claim 11, further comprising a memory key storage memory, the memory key storage memory operative to store encryption keys for the encrypted portions of the first and second sets of data, and the memory key storage memory being implemented in one or more integrated circuits, at least one of the one or more integrated circuits being separate from the integrated circuit comprising the central processing unit.

14. The apparatus of claim 1, wherein the apparatus comprises a mobile device.

15. The apparatus of claim 14, wherein the mobile device comprises a cellular telephone.

16. The apparatus of claim 14, wherein the mobile device comprises a personal digital assistant.

17. The apparatus of claim 14, wherein the mobile device is operative to transmit and receive electronic mail.

18. An integrated circuit comprising:
   a central processing unit, the central processing unit operative to execute at least a first software process utilizing a first set of data and a second software process utilizing a second set of data;
   wherein the central processing unit is coupled to a memory and to a memory management unit, the memory comprising a first memory portion operative to store the first set of data and a second memory portion operative to store the second set of data, and the memory management unit operative to allow the central processing unit to access the first memory portion only when executing the first software process and to access the second memory portion only when executing the second software process;
   wherein at least a portion of the first set of data and at least a portion of the second set of data are encrypted, and the encrypted portion of the first set of data is encrypted in accordance with a different encryption key than the encrypted portion of the second set of data.

19. A method of processing data in an apparatus comprising a central processing unit and a memory including a first memory portion and a second memory portion, the method comprising the steps of:
   executing a first software process utilizing a first set of data and a second software process utilizing a second set of data;
   storing the first set of data in the first memory portion and the second set of data in the second memory portion; and
   allowing the central processing unit to access the first memory portion only when executing the first software process and to access the second memory portion only when executing the second software process;
   wherein at least a portion of the first set of data and at least a portion of the second set of data stored in the memory are encrypted, and the encrypted portion of the first set of data is encrypted in accordance with a different encryption key than the encrypted portion of the second set of data.

20. The method of claim 19, wherein at least said executing step is implemented in a microcontroller.

* * * * *